United States Patent
Zurwieden

(10) Patent No.: US 7,648,411 B2
(45) Date of Patent: Jan. 19, 2010

(54) PORTION PACK WITH A SUSPENSION LOOP AND METHOD AND DEVICE FOR ATTACHING IT

(75) Inventor: Martin Zurwieden, Sassenberg (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 12/037,204

(22) Filed: Feb. 26, 2008

(65) Prior Publication Data

US 2008/0207104 A1    Aug. 28, 2008

(30) Foreign Application Priority Data

Feb. 27, 2007    (DE) .................. 10 2007 009 782

(51) Int. Cl.
A22C 11/00    (2006.01)

(52) U.S. Cl. ........................................... 452/47

(58) Field of Classification Search ............. 452/21–32, 452/37, 46–48, 51
See application file for complete search history.

(56) References Cited

U.S. PATENT DOCUMENTS

| | | | | |
|---|---|---|---|---|
| 3,318,623 | A | | 5/1967 | Barroso |
| 3,951,262 | A | * | 4/1976 | Niedecker .................. 206/343 |
| 4,573,241 | A | * | 3/1986 | Niedecker .................. 206/345 |
| 4,612,684 | A | * | 9/1986 | Kollross .................... 452/35 |
| 4,694,537 | A | * | 9/1987 | Kollross .................... 452/48 |
| 4,720,010 | A | * | 1/1988 | Bertram .................... 206/345 |
| 5,100,364 | A | * | 3/1992 | Kollross et al. ............. 452/185 |
| 5,238,444 | A | * | 8/1993 | Schwimmer et al. .......... 452/48 |
| 5,755,022 | A | * | 5/1998 | Whittlesey ................ 29/788 |
| 5,772,499 | A | * | 6/1998 | Niedecker ................. 452/185 |
| 6,390,912 | B1 | | 5/2002 | Niedecker |
| 7,134,955 | B2 | * | 11/2006 | Steinke et al. ............... 452/48 |
| 7,294,050 | B2 | * | 11/2007 | Steinke et al. ............... 452/48 |

FOREIGN PATENT DOCUMENTS

| | | |
|---|---|---|
| DE | 2132456 | 2/1973 |
| DE | 2234434 | 1/1974 |
| DE | 25 05 672 | 8/1976 |
| DE | 32 44 775 | 6/1984 |
| DE | 10 2004 024 916 3 | 11/2005 |
| EP | 0144947 | 12/1984 |
| EP | 0 719 707 | 7/1996 |

OTHER PUBLICATIONS

"Was ist ein Knoten?", 4 Knoten fur Standardanwendungen, Jul. 2006, pp. 1-5.
EP 08 15 1830 International Search Report dated Aug. 25, 2008.

* cited by examiner

*Primary Examiner*—Thomas Price
(74) *Attorney, Agent, or Firm*—Hahn Loeser & Parks LLP; Michael H. Minns

(57) ABSTRACT

A suspension loop for a portion pack, consisting of a tubular sleeve, sealed on its ends by clips, in particular sausages, is attached to the end of a tubular sleeve drawn together to form a string of sausages by a twist knot formed from the suspension loop. The suspension loop, kept ready, clamped in rectangular shape, is pulled through the loop around the string with the aid of a swivelable looping finger. The device suitable for this additionally has a holding fork and a movable clamping fork, both of which are two-pronged. The device can be swiveled into the sealing device when the tubular sleeve is sealed with clips.

11 Claims, 6 Drawing Sheets

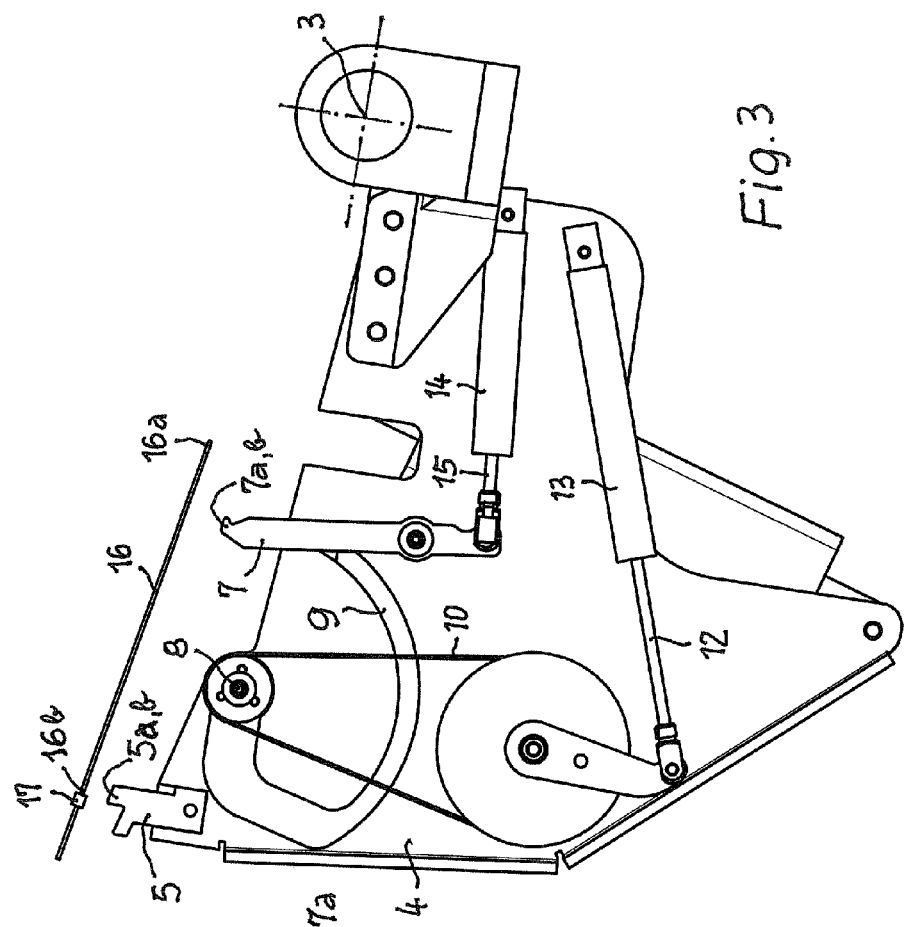
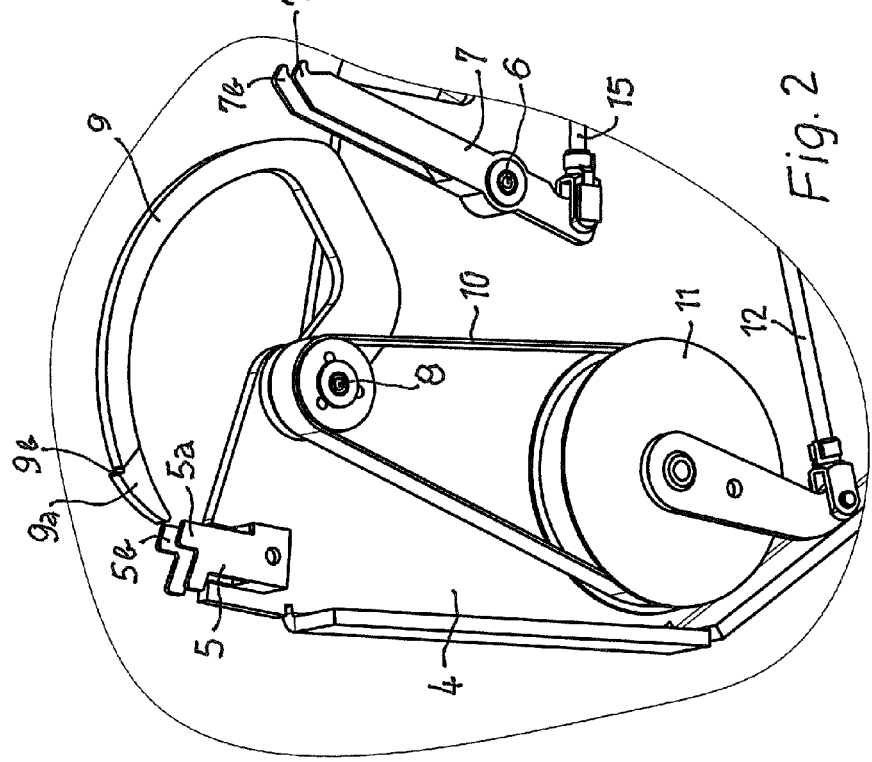

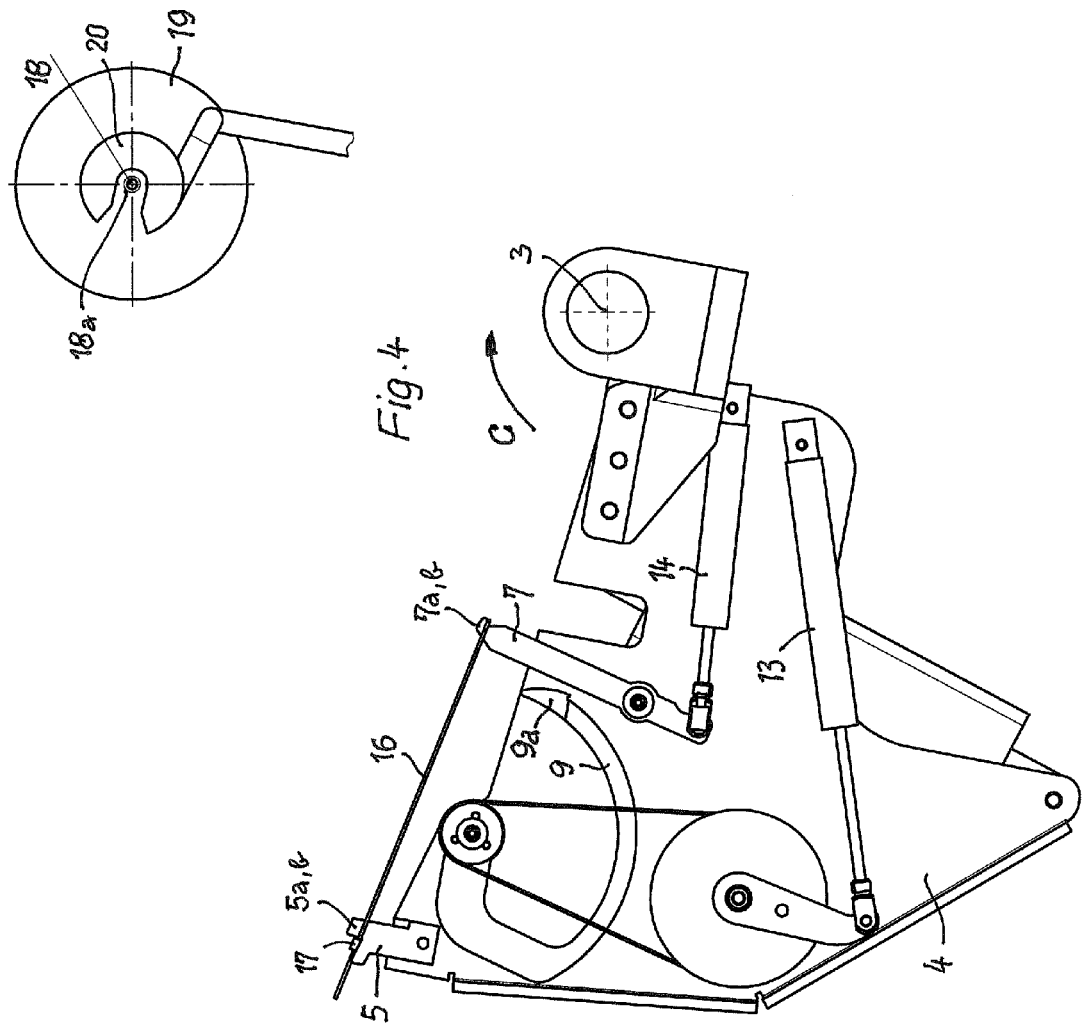

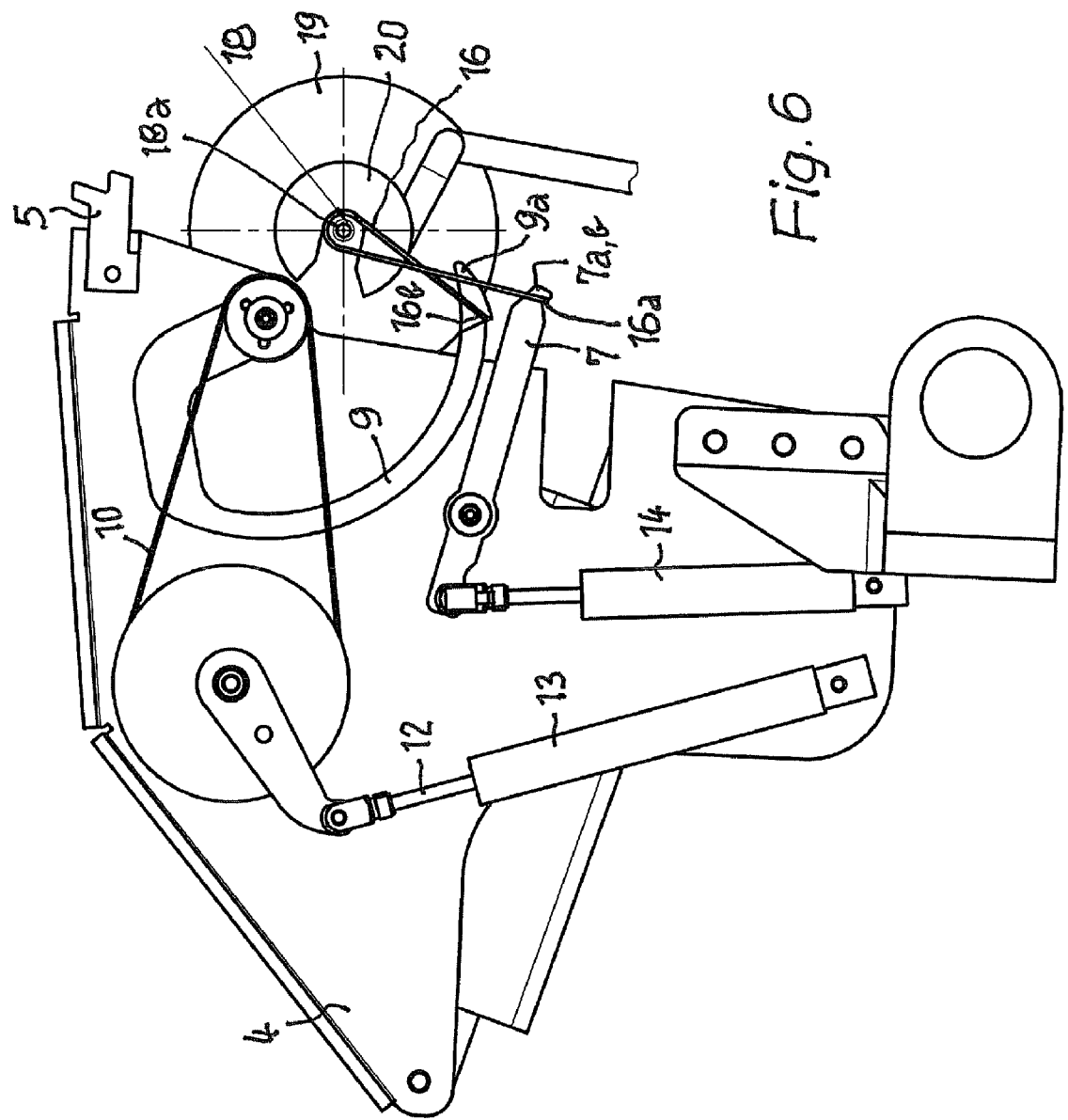

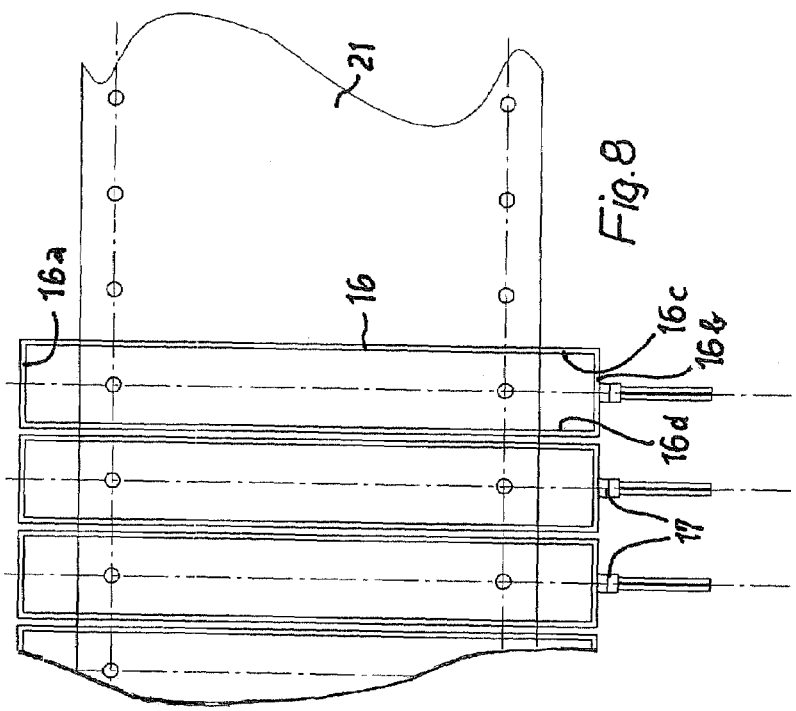
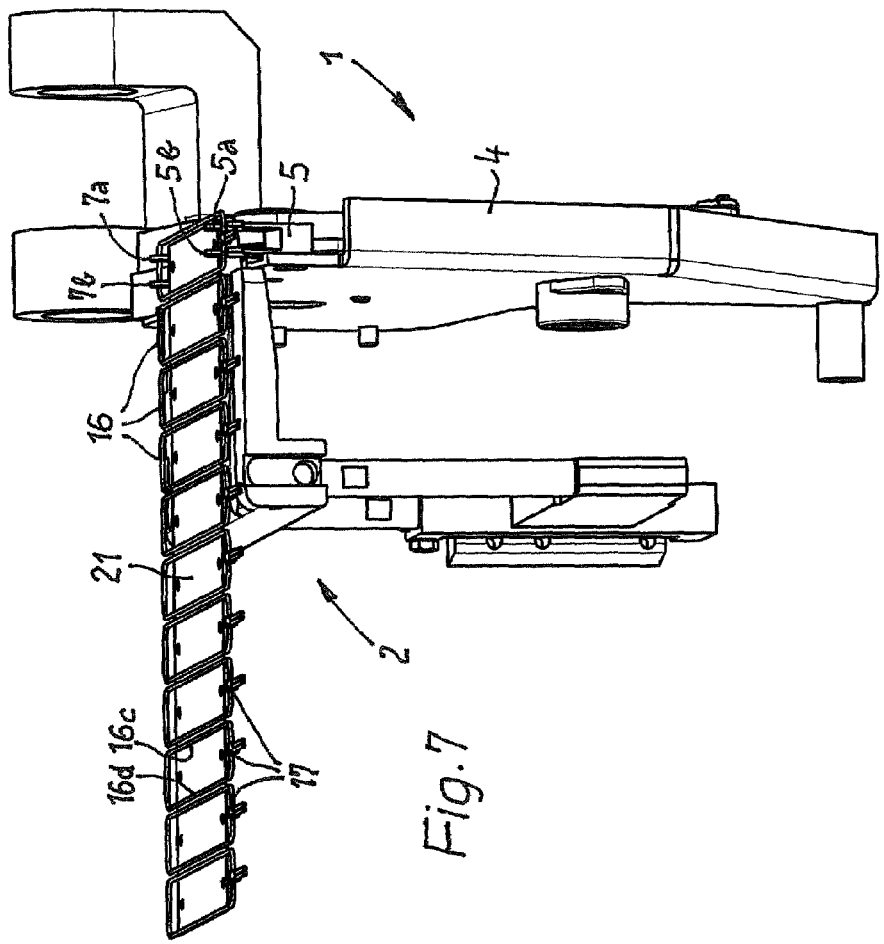

PORTION PACK WITH A SUSPENSION LOOP AND METHOD AND DEVICE FOR ATTACHING IT

BACKGROUND AND SUMMARY OF THE INVENTION

The invention relates to a portion pack in the form of a tubular sleeve, in particular sausages, filled with a filling varying from small pieces to a paste and sealed at the ends by clips set onto sleeve sections drawn together to form plait-like strings, in which a suspension loop is attached to one of the plaits adjacent the clip. It further relates to a method for attaching a suspension loop to a tubular sleeve drawn together to form a plait or braid-like string and a device suitable therefor.

It is known to equip sausages sealed at their ends by clips with a suspension loop in such a way that during the sealing process a prepared loop is placed into one of the clips and when it is pressed around the string of tubular sleeves it is attached to the clip and therefore to the string of tubular sleeves. Attaching the suspension loop to the clip leads to problems in particular if the tubular sleeve has to be moistened before filling, which is especially the case for certain types of sausage. The tubular sleeve absorbs water and thereby increases the volume of the string of tubular sleeves around which the clip is pressed. On subsequent treatments of the suspended portion pack (in the case of sausage possibly boiling, smoking, etc.) the water then escapes from the string of tubular sleeves, thus reducing the closing pressure of the clip. This is not usually a problem for the pack closure, but it has happened that—in the case of certain tubular sleeve materials—such as large and heavy portions hanging on the suspension loop may pull the string of tubular sleeves out of the clip and the portion pack falls off.

It is further known from DE 25 05 672 A1 to form a suspension loop from supplied binding twine and to fasten it to the string of tubular sleeves in the way initially indicated behind the clip, in other words between it and the actual sausage, by so-called tying off with a knot customary for the purpose. This method of attaching the suspension loop is also unable to prevent the clip being stripped off and carried along during drying of the tubular sleeve in the course of treatment procedures subsequent to the filling process, because the frictional engagement of the knot with the string of tubular sleeves is reduced.

The invention solves the problem depicted in that the attachment consists of a throttle knot or twist knot, encompassing the string with a circumferentially closed suspension loop. In contrast to a tying-off knot, the twist knot, also designated as a "clamping knot", automatically adjusts to the changing volume, and therefore the diameter of the packaging string, wherein the frictional engagement between the twist knot and the string, which determines the security of the attachment, becomes greater the heavier the pack hanging on the suspension loop is; the frictional engagement therefore also adjusts automatically to the requisite retention force.

The formation of clamping knots is widely known per se. In connection with sausage production, for example, in DE 1 507 943 A1 (U.S. Pat. No. 3,331,623), a clamping knot for fixing the thread ends while tying off the string can be seen, whereby the knot is prevented from coming undone by friction; the simultaneously formed loop can indeed be used to suspend the sausage, but is not attached to the string by a twist knot and is not therefore pulled tighter as the loading increases.

EP 0 719 707 A1 describes a binding machine for tying off flexible containers by means of a lacing cord by forming a clamping knot, which is not part of a closed suspension loop, however, and therefore also does not form a twist knot which is subject to the tensile stress of the suspended weight.

It is of particular significance that the type of loop fitting according to the invention, by using a circumferentially closed suspension loop, allows it to be attached in the course of the filling operation of a filling and sealing machine without interruption, because the necessary steps of the attaching procedure can be integrated into the sealing sequence after the previous tubular sleeve has been filled. Accordingly the method according to the invention for attaching a suspension loop to a tubular sleeve gathered to form a plait-like string, in particular a sausage sleeve, exists in that the loop closed in the form of a rectangle clamped in an elongated narrow shape is guided tangentially to the string of tubular sleeves, then the loop is gripped through near a first rectangular end out of the tangential plane on a path concentric to the axis of the tube and from the side of the string opposite the tangential plane the loop is taken hold of at the other, second rectangular end, whereupon this second loop end is pulled through the loop near its first rectangular end, while maintaining the clamping, and the thus formed twist knot is pulled tight.

Suspension loops circumferentially closed by appropriate pre-fabrication are known per se, for example from DE 32 44 775 A1 (U.S. Pat. No. 6,390,912) and DE 198 15 574 A1. However, attaching them to a string of sausages has so far been done with the aid of a clip, as initially described.

A device for attaching a suspension loop to a tubular sleeve drawn together to form a plait-like string is distinguished in that arranged on a mount are a stationary two-pronged holding fork and a two-pronged clamping fork, movable relative to one another and perpendicular to the plane of its prongs, and a curved looping finger attached on one side and swivelable over a partial circle, wherein the prongs of both forks are essentially perpendicular to a plane connecting the forks and can clamp between them the circumferentially closed suspension loop in the form of an elongated, narrow rectangle, which extends tangentially to the string with both longitudinal sides at the start of an attachment cycle, and wherein the looping finger has a hooked tip, which during its swiveling movement, moves out of a neutral position on the side of the rectangular loop opposite the string through the rectangular loop near its first rectangular end held by the clamping fork around the string to the other (second) rectangular end, releases this from the holding fork and on swiveling back around the string and through the suspension loop carries it along on the first rectangular end, thus creating a (throttling) twist knot which fixes the suspension loop to the string.

Preferred configurations can be seen in the subordinate claims relating to this device claim.

BRIEF DESCRIPTION OF THE DRAWING FIGURES

The drawing figures represent an embodiment of this device.

FIG. 2 shows in a correspondingly perspective schematic illustration a detail from an elevation in the direction of arrow A in FIG. 1;

FIG. 3 shows in side view the essential elements of the device part for producing the twist knot before the start of an operating cycle;

FIG. 4 shows an illustration corresponding to FIG. 3 after the suspension loop has been clamped between the holding and clamping forks;

FIG. 6 shows an illustration corresponding to FIG. 3 at the moment when the twist knot is formed;

FIG. 7 shows an illustration corresponding to FIG. 1 with the suspension loop feed device during delivery of a suspension loop; and FIG. 8 shows a—relatively enlarged—horizontal projection on to a belt band section with suspension loops.

DETAILED DESCRIPTION

Figure 1:
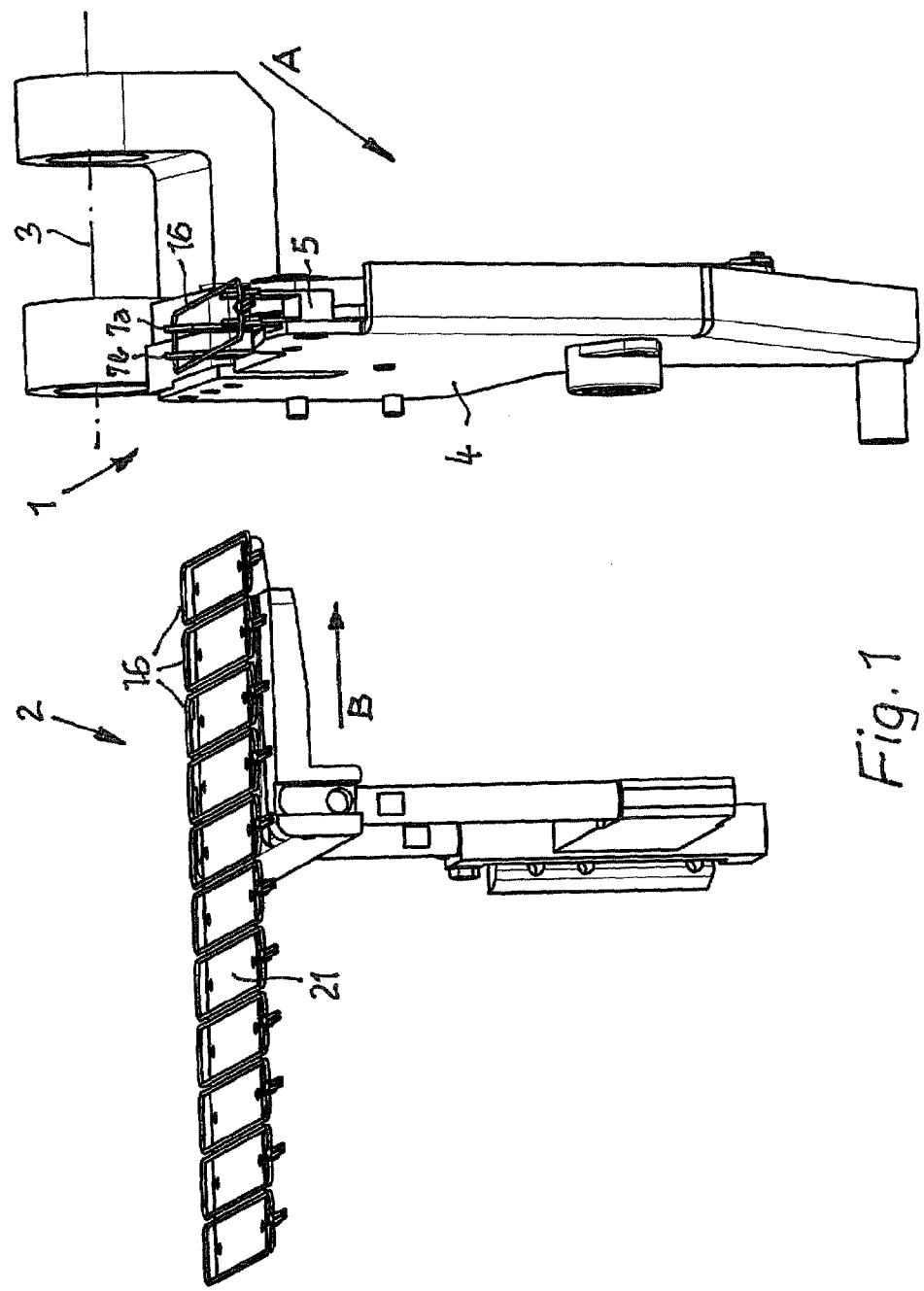
FIG. 1 shows in a perspective schematic illustration the essential elements of the device according to the invention.

The device for producing and attaching a twist knot formed from a suspension loop to the string of a tubular package, drawn together to form it, in particular a corresponding sausage sleeve, consists according to FIG. 1 essentially of a looper 1 and a suspension loop feed implement 2. In the example the device is overall a piece of supplementary equipment for a sealing implement—not illustrated—for portion packs of this kind, which are equipped with a suspension loop for the purpose of handling and storing. For this purpose the looper 1 can be swiveled about axis 3 into the sealing implement, while the feed implement 2 can be moved up to the looper 1 in the direction of arrow B (cf. FIG. 7).

The looper 1 has a plate-shaped mount 4, on which are arranged a stationary holding fork 5, a clamping fork 7, which is swivelable about swivel pin 6, and a looping finger 9, of essentially semi-circular shape, which is attached on one side to the mount 4 and swivelable about swivel pin 8. Both the holding fork 5 and the clamping fork 7 are two-pronged, the prongs 5a and b or 7a and b being perpendicular to a plane connecting the forks 5, 7 and the swivel plane of the looping finger 9 being located between the planes determined by prongs 5a, 7a or 5b, 7b and perpendicular to the aforesaid plane.

The looping finger 9, which in FIG. 2 is in a partially swiveled in operating position, is swiveled by a belt 10 of a driving pulley 11, which is in turn actuated by the piston rod 12 of an actuating cylinder 13 (FIG. 3). A similar actuating cylinder 14 swivels the clamping fork 7 by means of piston rod 15.

FIG. 3 shows the looper in a schematic side view at the start of an operating cycle. A suspension loop 16, which is closed circumferentially by a knot 17, in particular a fisherman's knot, is kept ready in a way not illustrated in greater detail (but cf. FIG. 7). The mount 4 is then swiveled upwards about axis 3 until the prongs 5a, 5b and 7a, 7b of the forks 5, 7 are located inside the suspension loop 16. Hereupon cylinder 14 is actuated and swivels the clamping fork 7 in a clockwise direction until its prongs 7a, 7b take hold of the end 16a of the loop 16, while the other end 16b of the suspension loop 16 is adjacent to prongs 5a, 5b and the suspension loop is clamped in rectangular shape between the two forks 5, 7; this state is shown in FIG. 4. The looper 1 is now swiveled about axis 3 in the direction of arrow C against the string of tubular sleeves 18, sealed by a clip 18a, of a tubular pack 19, so the clamped-in suspension loop 16 extends tangentially thereto. This state is shown in FIG. 5, and simultaneously with the looper 1, a longitudinally slit cone 20 (FIG. 5 shows it from the axial side of its largest diameter) has been swiveled from the other side against the string of tubular sleeves 18 and encompasses it in such a way that in the further course of the operating cycle it takes care of the desired axial orientation of the attachment of the suspension loop 16 to the string of tubular sleeves 18.

Figure 5:
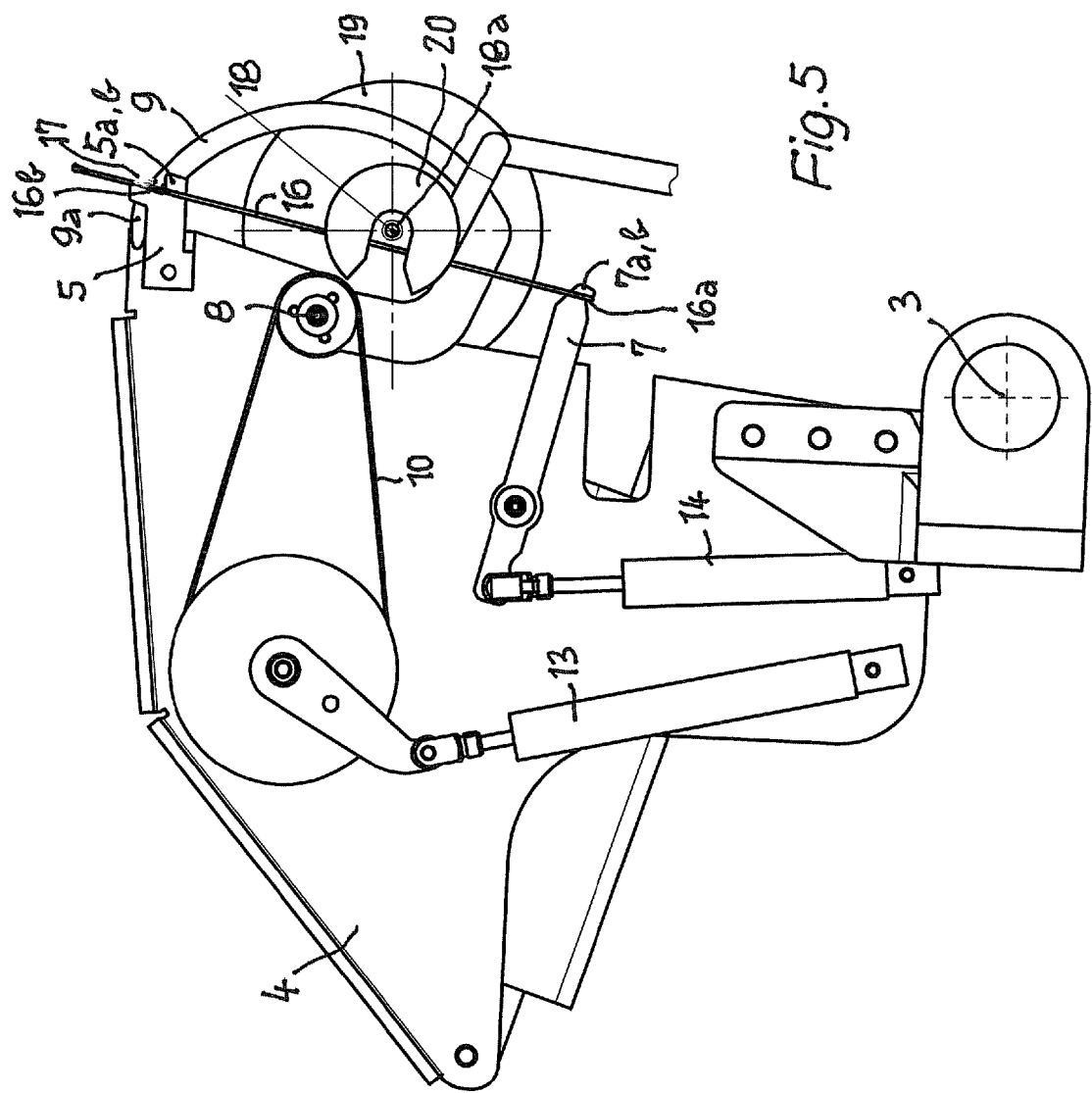
FIG. 5 shows an illustration corresponding to FIG. 3 at the moment when the loop is taken up by the looping finger.

The stage of the operating cycle illustrated in FIG. 5 additionally shows the curved looping finger 9 at the end of its swiveling out process effected by cylinder 13 through the inner face of the suspension loop 16 as far as that point at which its thickened tip 9a has lifted the end of the loop 16b from the prongs 5a, 5b of the holding fork 5 and picked up in the hook 9b formed behind the thickened tip 9a. During swiveling back of the looping finger 9, which starts thereupon, the piston 15 of cylinder 14 exerts a defined initial tension on the clamping fork 7, so the suspension loop 16 remains clamped when the looping finger 9 swivels back. During swiveling back, carrying along the end 16b of the suspension loop 16, the latter is placed around the string of tubular sleeves 18, until the tip 9a with its hook 9b and the end 16b of the suspension loop 16 attached detachably thereto reaches through the end 16a of the suspension loop held open by the clamping fork 7 and therein, as FIG. 6 represents, forms a twist knot. By further swiveling back of the looping finger 9 with simultaneous removal of the initial tension at end 16a of the loop 16—by swiveling of the clamping fork 7 in the anti-clockwise direction and release of end 16a from its prongs 7a, b—the twist knot is tightened. If the looper 1 then arrives in the preparatory position according to FIG. 4 by swiveling down the mount 4 out of its looper position (FIGS. 5, 6), end 16b of the suspension loop 16 is also detached from the hook 9b of the looping finger 9 and the suspension loop is finally attached to the string of tubular sleeves 18 by means of the twist knot.

FIG. 7 shows the provision of suspension loops 16 according to FIG. 2, but already in the position of the looper 1 illustrated in FIG. 4. The suspension loops 16 are attached next to one another on a belt band 21 according to FIG. 8 in such a way that their longitudinal sides 16c and 16d are parallel, the width of the belt band 21 being chosen in such a way that it is protruded over by the loop ends 16a and 16b only to such an extent that the prongs 5a, b or 7a, b of the holding and clamping forks 5, 7 can reach through the loop openings encompassed in each case by the edges of the belt and the ends 16a, 16b of the loops 16 protruding above them. Illustration of the suspension loops 16 in FIGS. 1, 7 and 8 as a rectangle is to be understood in a schematic sense, the ends of the loops 16a and 16b will generally be rounded there. However, when the loops 16 are clamped by the prongs of the holding and clamping forks 5, 7 an elongated narrow rectangular shape with corresponding rectangular ends 16a, 16b arises.

Having described the invention, what is claimed is:

1. In combination:
a portion pack in the form of a tubular sleeve filled with filling varying from small pieces to paste and sealed at the ends by clips to sections drawn together to form plait-like strings, and
a circumferentially closed suspension loop attached to one of the strings adjacent the clip, the attachment of the suspension loop comprises a twist knot encircling the filled string.

2. The combination according to claim 1 where the suspension loop comprises an elongated narrow loop having first and second ends with sides extending between the first end and the second end, the sides of the suspension loop being adjacent one another and extending around said one of the strings adjacent the clip, the first end of the suspension loop passing between said one of the strings and the second end and passing within the suspension loop thereby defining the twist knot.

3. A method for attaching a suspension loop to a tubular sleeve, drawn together to form a string, the method comprising the steps of:
- guiding the loop, closed in the form of a rectangle clamped in an elongated, narrow manner, tangentially to the string;
- gripping the loop near a first rectangular end out of the tangential plane on a path concentric to the axis of the tube;
- taking hold of the loop on the other, second rectangular end from the side of the string opposite the tangential plane;
- pulling said second loop end through the loop near its first rectangular end, while maintaining the gripping of the loop near the first rectangular end of the loop; and
- tightening the thereby formed twist knot.

4. A device for attaching a suspension loop to a tubular sleeve drawn together to form a string, the device comprising:
- a mount having a stationary two-pronged holding fork and a two-pronged clamping fork thereon, the holding fork and the clamping fork being movable relative to the one another and perpendicular to the plane of its prongs, and
- a curved looping finger, attached on one side of the mount and swivelable over a partial circle;
- the prongs of the two forks being essentially perpendicular to a plane connecting the forks and capable of clamping between them a circumferentially closed suspension loop in the form of an elongated narrow rectangle, which at the start of an attachment cycle has longitudinal sides extending tangentially to the string;
- the looping finger having a hooked tip, which during its swiveling movement moves out of a neutral position on the side of the rectangular loop opposite the string through the rectangular loop near its first rectangular end), held by the clamping fork, around the string to the other rectangular end, releases the latter from the holding fork and carries it along on the first rectangular end when swiveling back around the string and through the suspension loop, forming a twist knot attaching the suspension loop to the string.

5. The device according to claim 4, where the clamping fork is swivelable on the mount and is capable of keeping the suspension loop, after it has been clamped and while the second loop rectangular end is being carried along by the looping finger as it swivels back, at a defined initial tension, until the formation of the twist knot is complete.

6. The device according to claim 4, where the hooked tip of the looping finger has a radial thickened portion at an end thereof which lifts the suspension loop from said holding fork prongs and allows it to slide into the hook formed by the radial thickened portion when the holding fork swivels therethrough.

7. The device according to claim 4 where the mount is arranged on a clip sealing implement for strings of tubular sleeves in its operating area, so as to be able to swivel into and out of said operating area.

8. The device according to claim 7, where a radially slit cone is attached to the mount, the radially slit cone which in the swiveled-in state of the mount concentrically surrounds the string of tubular sleeves and allows the twist knot to move towards the clip when the twist knot tightens.

9. The device according to claim 4, further comprising:
- a feed implement capable of feeding suspension loops in magazines to the holding and clamping forks.

10. The device according to claim 9, where the feed implement has a belt band, on which the suspension loops are detachably attached next to one another with parallel longitudinal sides, slightly spaced apart, and protrude with their front ends above the edges of the belt band only to such an extent that the prongs of the holding and clamping forks can be inserted into the open end sections of the suspension loops.

11. In combination:
- a belt band; and
- closed suspension loops, detachably attached next to one another, the longitudinal sides of which are a parallel distance apart, the longitudinal edges of the closed suspension loops run near the transverse sides of the suspension loops leaving open loop openings only of sufficient size for inserting pick-up tools, the longitudinal edges being a parallel distance apart.

* * * * *

UNITED STATES PATENT AND TRADEMARK OFFICE
CERTIFICATE OF CORRECTION

| | | |
|---|---|---|
| PATENT NO. | : 7,648,411 B2 | Page 1 of 1 |
| APPLICATION NO. | : 12/037204 | |
| DATED | : January 19, 2010 | |
| INVENTOR(S) | : Martin Zurwieden | |

It is certified that error appears in the above-identified patent and that said Letters Patent is hereby corrected as shown below:

In claim 4, column 5, line 37, delete ")".

Signed and Sealed this

Eleventh Day of May, 2010

David J. Kappos
*Director of the United States Patent and Trademark Office*